(No Model.)

D. G. FITZ-GERALD.

SECONDARY BATTERY.

No. 301,351.  Patented July 1, 1884.

WITNESSES:
Theo. G. Hoster
C. Sedgwick

INVENTOR:
D. G. Fitzgerald
BY Munn & Co
ATTORNEYS.

UNITED STATES PATENT OFFICE.

DESMOND G. FITZ-GERALD, OF BRIXTON, COUNTY OF SURREY, ENGLAND.

SECONDARY BATTERY.

SPECIFICATION forming part of Letters Patent No. 301,351, dated July 1, 1884.

Application filed November 3, 1883. (No model.) Patented in England March 1, 1883, No. 1,122; in France September 1, 1883, No. 157,338; in Belgium September 3, 1883, No. 62,487, and in Germany September 12, 1883, No. 26,583.

*To all whom it may concern:*

Be it known that I, DESMOND GERALD FITZ-GERALD, a subject of the Queen of Great Britain, residing at Brixton, in the county of Surrey, England, electrician, have invented certain new and useful Improvements in Secondary Batteries, (for which I have received Letters Patent in Great Britain, No. 1,122, dated March 1, 1883,) of which the following is a specification.

This invention relates to improvements in secondary batteries or accumulators. In secondary batteries with lead electrodes as hitherto constructed, the plate constituting the anode, in charging, becomes more or less rapidly disintegrated by reason of local action set up between the metal and the lead peroxide produced, these being in contact with each other and with the electrolyte.

Now, my invention consists in the manufacture of indestructible electrodes—that is to say, of electrodes which will last for an indefinite or comparatively lengthened period—by the use of any suitable impervious and insulating material with which the electrode is in part coated or protected. The object of so coating or protecting an electrode is to prevent its total disintegration, more especially in the case of the anode or positive electrode, (in charging,) by preserving certain portions of unaltered metal, which can be attacked by the electrolyte only in the direction of the plane of the plate instead of at every point of the surface of the plate, as hitherto has been the case. With this construction the internal resistance of the battery is not materially augmented if the protection be confined to the anode. The impervious and insulating materials I prefer to make use of are either of the substances known in commerce, respectively, as "Prout's glue," "charakite," and "Jeffrey's marine glue." The first-named material gives the best result; but mixtures of two or more of the following substances—viz: caoutchouc, shellac, resin, asphalt, paraffine-wax, beeswax, pitch, asbestus (in powder)—may be found suitable.

My indestructible electrodes may be made in either of the following forms or ways; but it must be understood that I do not limit myself to these particular modes of construction.

Figure 1:
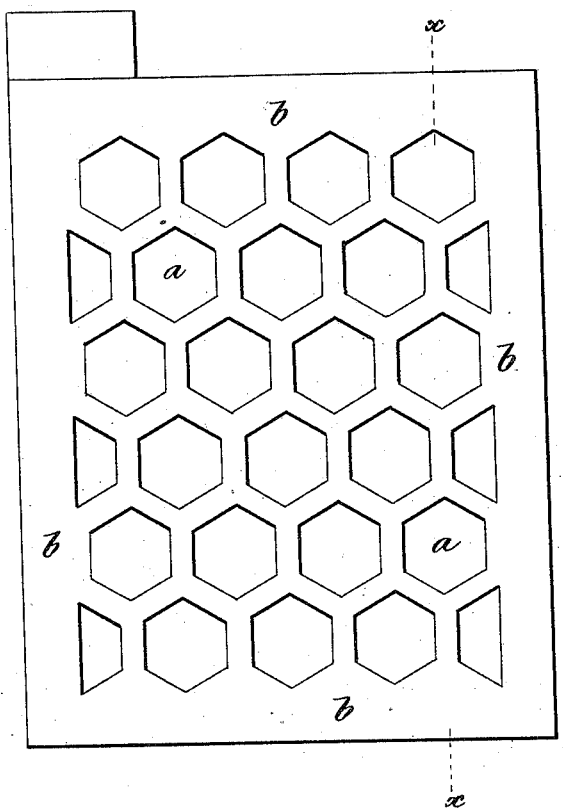
Figure 2:
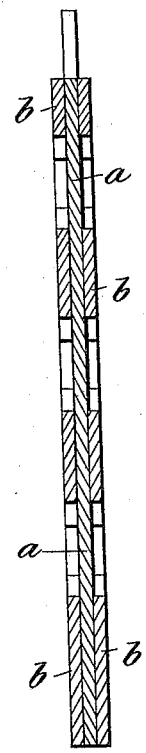

First. I take a sheet of lead, *a*, (see the accompanying sheet of drawings, Figures 1 and 2,) punctured over both surfaces, or one surface only in the case of terminal plates, by means of needle-points, whereby the surface and consequently the charging capacity of the plate are increased. I then protect certain portions of the surface by the application of a net-work, *b*, of the impervious material formed by rolling it into sheets of suitable thickness and then making through-openings of any suitable shape in the sheets by punching out or otherwise removing the material, so as to leave it in the form of a regular open net-work or frame-work, which is then applied to the lead plate while the latter is sufficiently hot to cause the material to adhere firmly thereto. When both surfaces of the lead plate are to be protected, it is desirable that the apertures of the insulating-coverings should coincide with one another, so as to insure the preservation of a net-work or honeycomb-like structure of lead unaltered throughout its thickness. Instead of applying the impervious material in the above form, it may be applied in the form of strips, which may be crossed or interlaced, or preferably arranged in parallel strips, with intermediate distance-pieces or cross-bars fitting between the longitudinal strips and united thereto by the heat, which at same time causes them to adhere to the plate. I do not, however, limit myself to the precise methods of applying the impervious material, as others might also be adopted.

Figure 3:
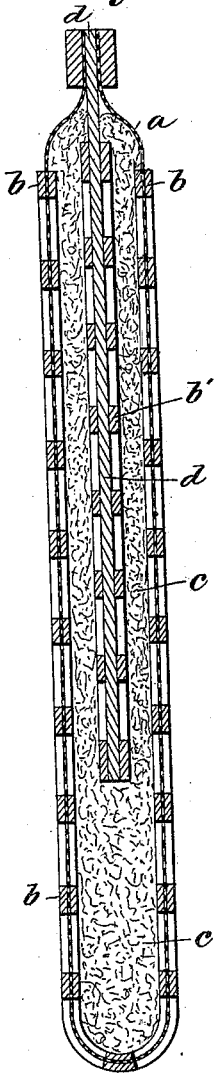

Second. I inclose in a perforated receptacle, constructed as hereinafter described, porous or spongy lead, which may be obtained by chemical precipitation—as, for instance, from the acetate by means of zinc, or by electro-deposition, or mechanically. The envelope or casing is formed of a sheet of lead, *a*, or any suitable alloy of this material, perforated with small holes placed so close together that at least fifty per cent. of the material is removed by the perforation. This perforated sheet is protected on both sides by a net-work of impervious material, *b*, applied as before described, and shown in Fig. 1, (care being taken that the apertures in the two protecting-sheets coincide.) This protected perforated sheet having been bent double, as shown in cross-section in Fig. 3, and the spongy lead having been placed between, as shown at *c*, the edges of the envelope are bent inward and the whole is subjected to sufficiently powerful pressure in a suitable mold to make the spongy lead and envelope form a coherent plate. The edges of the compound plate may be inclosed by strips of the impervious material applied after the plate is compressed. I obtain contact with the element by means of this perforated casing alone or in conjunction with a central conducting-plate, *d*, as shown in Fig. 3, either of lead or of a suitable alloy of this metal. I cover or inclose this central conducting-plate on both sides with a perforated, reticulated, or open-work sheet of the preservative insulating material *b'*, as in the case of the electrode previously described.

A modification of the last-described method of construction is to extend the central protected plate, *d*, to the whole depth and width of the electrode, and to dispense with the perforated metallic envelope *a*, the external insulating material, *b*, alone serving to prevent disintegration of the porous material. In this mode of construction very powerful pressure should be applied to consolidate the plate prior to the application of the protective covering, which is then caused to adhere by the aid of heat, as first above described.

I am aware that the frames of secondary batteries for holding the active materials— such as Prussian blue and lead oxide—have been provided with bamboo screens on each side thereof for keeping said active materials in place, and I do not claim any such construction. These screens, however, are not for the same purpose as the coating that I employ, as they are simply to keep the powders from falling out of the frame, while my coating is designed to confine the attack of the electrolyte to certain circumscribed areas on the electrode, and to thereby preserve a comb-like structure to prevent total disintegration of the electrode.

Having described the nature of my invention and the manner of performing the same, I would have it understood that I do not limit myself to the methods of producing the electrodes above described, as these are given by way of example only, but that what I claim as my invention is—

1. An electrode of lead or alloy of lead protected by a perforated or intersticed coating of impervious, insulating, and non-attackable material secured firmly to the working face or faces of said electrode, whereby the attack of the electrolyte is confined to certain circumscribed limits and total disintegration of said electrode is prevented, substantially as set forth.

2. An electrode consisting of a plate of lead or alloy thereof provided on both sides with a coating of impervious, insulating, and non-attackable material, said coating material being provided with apertures or interstices which coincide, whereby the preservation of a net-work or honey-comb-like structure of lead unaltered throughout its thickness is insured, substantially as set forth.

3. In a battery, the bent perforated plate of lead or its alloy *a*, provided on both sides with a perforated or intersticed coating of impervious insulating material, the whole forming a casing and a filling of spongy lead within said casing, the edges of casing being bent inward, and the perforations or interstices in the coating coinciding, substantially as set forth.

4. In a battery, the central plate, *d*, of lead or its alloys, provided on both sides with a perforated or intersticed coating of impervious, insulating, and non-attackable material, the perforations or interstices of which coincide, a casing composed of a bent perforated sheet of lead, *a*, provided also with a perforated or intersticed coating of impervious, insulating, and non-attackable material, the perforations or interstices of which coincide, the space between the casing and central plate being filled with spongy lead, and the ends of the casing being bent inward to the upper end of the plate *d*, substantially as set forth.

5. As a new article of manufacture, a coating for the working face or faces of electrodes, consisting of a perforated sheet of adhesive, impervious, insulating, and non-attackable material, whereby when firmly adhering to the electrode the attack of the electrolyte will be confined to the portions of the electrode beneath the perforations, substantially as set forth.

DESMOND G. FITZ-GERALD.

Witnesses:
 JNO. DEAN,
 J. WATT,
*Both of 17 Gracechurch Street, London.*